INVENTORS
ELMER G. SHESLER
ELMER A. BOWEN
RONALD F. BURDEN

BY Henry A. Marzall Jr.
ATTORNEY

United States Patent Office 3,350,485
Patented Oct. 31, 1967

3,350,485
APPARATUS FOR AND METHOD OF CONTROLLING THE T/L RATIO OF THE CTE IN EXTRUDED CARBONACEOUS STOCK
Elmer G. Shesler, Fostoria, Ohio, Elmer A. Bowen, Westport, Conn., and Ronald F. Burden, Lewiston, N.Y., assignors to Union Carbide Corporation, a corporation of New York
Filed June 5, 1964, Ser. No. 372,888
3 Claims. (Cl. 264—105)

This invention relates to an apparatus for and method of controlling the tranverse to longitudinal (T/L) ratio of the coefficient of thermal expansion (CTE) in extruded carbonaceous stock. More particularly it refers to a novel method of manufacturing carbonaceous bodies which exhibit improved and controlled thermal expansion properties.

In manufacturing carbonaceous stock by extrusion, particularly where needle-like coke particles are used, the needle-like coke particles become so oriented that their longitudinal axes are substantially parallel to the direction of extrusion. This results in an extruded product having anisotropic thermal and electric properties as well as an anisotropic structure. The ratio of transverse to longitudinal coefficient of thermal expansion for such material after baking and graphitization is invariably high and in the order of 2/1–2.5/1, primarily because of particle alignment during extrusion and since the coefficient of thermal expansion in needle-like coke particles in the transverse direction (against grain) is higher than the CTE in the longitudinal direction (with grain).

Carbonaceous bodies made from petroleum coke which are subsequently converted to graphite by heating in an electric furnace to temperatures in excess of 2600° C. are used as a moderator material to slow down neutron velocities in the production of thermal energy from fissile materials.

A source of material for the production of moderator graphite is coke produced from petroleum distillates. Such coke is relatively free from impurities which have a high neutron capture cross section, such as vanadium, boron and cadmium. Coke produced from distillate petroleum characteristically results in a material having a macroscopic structure generally described as "needle-like" or "needle class 1" coke which when graphitized is highly crystalline and which is extremely well suited for the manufacture of graphite electrodes used in electric arc furnaces designed for melting and refining metals in the production of steel.

Graphite in the form of moderator blocks for nuclear reactors, and as thermic electrodes, is usually shaped by extrusion of a pitch bonded aggregate of petroleum coke flour and carefully sized petroleum coke particles.

When made from needle type coke, such extruded bodies are found to display a high degree of anisotropy of structure. For instance, measurements of the coefficient of thermal expansion obtained within the extruded graphitized body in a direction transverse, and then parallel to the direction of extrusion usually are in a ratio of more than 2 and sometimes nearly 3. While this high degree of anisotropy is generally in no way detrimental to the performance in service of thermic electrodes, in fact electrodes made from needle-type coke are generally superior, such ratios require that moderator blocks used in nuclear reactors be carefully positioned within the reactor with respect to the direction of structural anisotropy in order to minimize or compensate for the destructive effect resulting from neutron irradiation.

Although less subject to the effect of irradiation particularly at temperatures above 300° C., than less crystalline graphites made from non-needle cokes, such as those produced from the residuum of vacuum distilled petroleum, moderator bars extruded from needle coke are sufficiently anisotropic structurally to be distorted after neutron irradiation. Such bars generally are of such structure that the transverse thermal expansion coefficient is at least twice that of the longitudinal axis and consequently permanent distortion of the bars occurs under neutron irradiation.

This dimensional distortion which is in proportion to the degree of structural anisotropy may result in misalignment of control rod channels and other mechanical problems associated with the operation of the reactor.

Accordingly, it is, therefore, the principal object of the invention to provide a novel method of controlling within limits the thermal properties of needle-like carbonaceous bodies produced by means of a typical extruder such that dimensional distortion due to neutron irradiation can be somewhat compensated.

It is a further object of the invention to provide extruded carbonaceous bodies made of needle-like coke which exhibit improved thermal properties and which are suitable for use as moderators in nuclear reactors.

Broadly stated the objects of the invention are accomplished by extruding a suitable needle-like carbonaceous composition through special passageways such that the material is radially fed toward the center of the forming die and then immediately forced out of the die axially.

More specifically, the preferred means by which the method of the invention is achieved comprise an auger extruder, an obstruction or baffle plate provided transverse the auger chamber axes and preceeding the front of a forming die, which plate breaks up the parallel oriented needle-like coke particles exiting from the auger and forces the mix to flow radially toward the center of the extruder just prior to entering the die portion of same.

The objects and advantages of the invention will be further described with reference to the following description when read in light of the accompanying drawing, in which.

Figure 1:
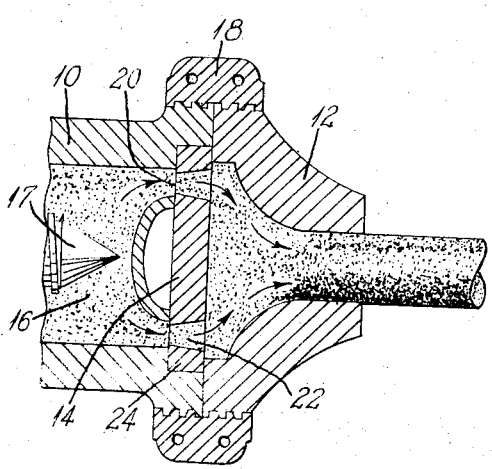
FIGURE 1 is a sectional view, in elevation, of a typical extruder apparatus used in the practice of the process of the invention, wherein a special baffle plate is employed to upset the needle-like coke particles flowing therethrough.

Referring now to the drawings, and more particularly to FIGURE 1, the apparatus shown therein comprises an extrusion barrel 10, a forming die 12 and a stationary obstructing plate 14. The mix stream is driven and forced through the extrusion barrel 10 by suitable means such as an auger screw 17. A suitable clamp 18 secures together the extrusion barrel 10 and the forming die 12, and the plate 14 is suitably attached to the extrusion barrel 10 in the vicinity of the exit end 20 of same. Provided about the peripheral portion 24 of the plate 14 is a plurality of apertures 22 which break up the longitudinally advancing mix stream 16 into a plurality of more radially oriented streams just prior to the entrance of the mix stream 16 into the forming die 12. By this action, the needle-like coke particles constituting the bulk of the mix stream 16 which emerge in parallel alignment with each other from the extrusion barrel 10 are then abruptly changed in course and directed to flow more radially inward toward the center of the forming die 12, as shown by the arrows. This change in direction or course serves to randomly re-orient and disalign the needle-like coke particles thus affecting the coefficients of thermal expansion in both longitudinal and transverse directions. By the practice of the invention the tendency of extruded needle-like coke particles to be anisotropically arranged can therefore be altered so as to give a more preferred controlled isotropic arrangement. Due to the more nearly isotropic arrangement of the needle-like coke particles, the thermal expansion properties are also made more nearly isotropic.

It should be noted that it is generally not necessary to employ an orientation chamber as described in our Patent No. 3,196,486 filed Apr. 16, 1962 in the apparatus of the present invention since we are not concerned with the problem of "coring" and since a long uniform diameter chamber disposed after the obstructing plate but prior to the forming die would negate the very function of said plate by re-aligning the needle-like coke particles as they pass therethrough.

Figure 2:
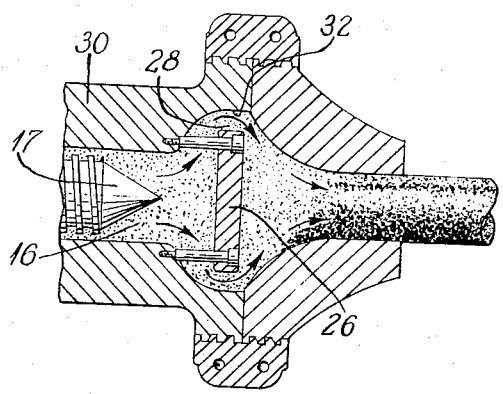
FIGURE 2 is a sectional view, in elevation, of the apparatus of FIGURE 1 illustrating the use of a modified baffle plate.
Figure 3:
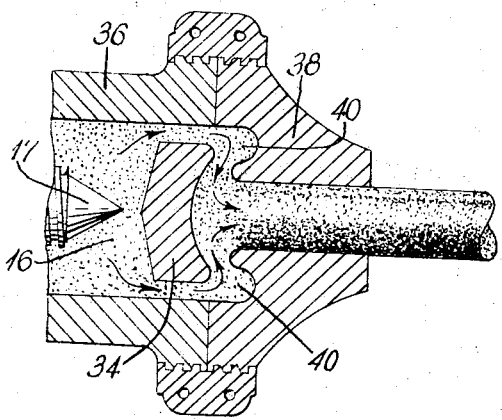
FIGURE 3 is a sectional view, in elevation, of another modified baffle plate in the apparatus of FIGURE 1.

The plate 14, may be replaced by other means for upsetting the needle-like coke particles of the mix 16, such as the solid baffle plate 26 of FIGURE 2. In this embodiment, the baffle plate 26 is so mounted that the carbonaceous mix stream 16 will flow through the annular space 28 provided between the baffle plate 26 and the end of the wall of the extrusion barrel 30 which is provided with a larger curved chamber or cavity 32. The baffle plate may be smaller in diameter than the diameter of the extrusion barrel and FIGURE 3 illustrates such a design. As shown therein, the baffle plate 34 is suitably attached to the extrusion barrel 36 by means of spokes or the like (not shown). The internal shape of the forming die 38 is unlike that of FIGURES 1 and 2 which are of the conventional contoured type but rather is more uniform in diameter except for the cut-out segment 40 adjacent the baffle plate 34. This shape aids in providing a more truly oriented radial flow to the mix stream.

Figure 4:
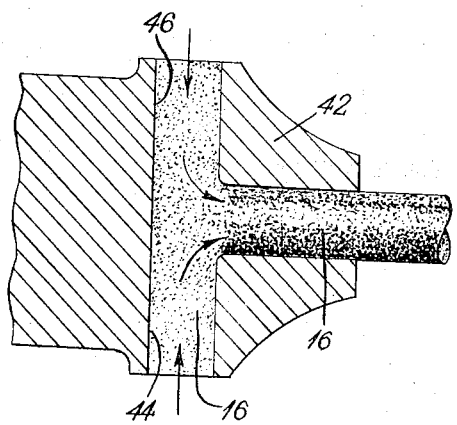
FIGURE 4 is a sectional view, in elevation, of a modified apparatus which may also be used in the practice of the process of the invention.

In FIGURE 4, a modified form of the apparatus is illustrated. In this particular embodiment of the invention, the mix stream 16 is forced into the forming die 42 from a plurality of directions as shown at 44 and 46. Of course, either multiple extruders must be used in such an apparatus or other suitable means such as a single auger extruder along the lines of FIGURES 1, 2 and 3 would be necessary in order to secure separate streams of mix material radially flowing toward the die area and combining into one stream at the die just prior to emerging therefrom as a finished product.

The following specific examples illustrate more clearly the manner in which the present invention is carried out. The invention is not to be construed as being limited to the examples set forth herein

*Example I*

A carbonaceous mixture consisting by weight of 21% coal tar pitch binder, 2% petroleum oil base lubricant and 77% of an aggregate of needle-like calcined petroleum coke particles and flour; the particles constituting 55% of the aggregate and ranging in Tyler screen size from through 3 mesh to just under 20 mesh and the flour having been milled to a fineness of 55% through 200 mesh constituting the balance of the aggregate, was auger extruded by the extrusion device shown in FIGURE 1. The resulting extruded stock had a diameter of about 14 inches.

After conventional baking and graphitizing at about 2600° C., thermal expansion measurements were made on the stock in both the transverse and longitudinal directions. This data is tabulated along with other data which provides a basis for the comparison of the thermal expansion properties of the stock made in a conventional mud-chamber and those made in an auger extruder similar to that of FIGURE 1 except that an orientation sleeve was used. Also corresponding data relative to non-needle coke particles is presented.

TABLE I

| Type of Coke Particles Used in Mix | Extrusion Press | | | CTE of Graphitized Stock (×10⁻⁷) | | |
|---|---|---|---|---|---|---|
| | Type | Orientation Sleeve | Baffle Plate | Trans. | Long. | T/L |
| Needle-like | Auger | No | Yes | 19.7 | 15.6 | 1.26 |
| Do | do | Yes | Yes | 14.4 | 6.9 | 2.1 |
| Do | Conventional (mud-chamber; hydraulic type extruder). | | No | 18.8 | 7.6 | 2.5 |
| Non-needle | Auger | No | Yes | 22.4 | 19.0 | 1.17 |
| Do | do | Yes | Yes | 22.2 | 15.2 | 1.46 |
| Do | Conventional (mud-chamber; hydraulic type extruder). | | No | 22.7 | 17.7 | 1.28 |

From an examination of this data, it can be seen that the ratio of the transverse to longitudinal CTE of formed stock made from needle-like coke particles in the apparatus of the invention is controlled by lowering it a considerable degree so that it approaches the T/L ratio of the formed stock made of non-needle coke. It should also be apparent that the presence of the orientation chamber has a marked effect in raising the T/L of the product made from needle-like coke particles and has little effect on the T/L ratio of the product made from non-needle coke particles.

Table II following contains aidditional data which was tabulated from further experiments. These results compare the CTE of 14″ diameter stock formed with the apparatus shown in FIGURES 1 and 2 versus stock made by the standard (mud-chamber) hydraulic type extruder. All figures represent the average of all data reported.

TABLE II

| Type of Coke Particles Used in Mix | Extrusion Press | | CTE (×10⁻⁷) | | |
|---|---|---|---|---|---|
| | Type | Baffle Plate | Trans. | Long. | T/L |
| Needle-like | Figure 1 | Yes | 21.2 | 15.0 | 1.42 |
| Do | Figure 2 | Yes | 21.4 | 13.9 | 1.54 |
| Do | Hydraulic Extruder. | No | 19.0 | 7.5 | 2.55 |

It is to be noted that the values for the transverse and longitudinal coefficients of thermal expansion and the ratio of T/L are about the same as those represented in Table I. Thus it should be realized that the method and apparatus of the invention provides an extruded carbonaceous body which exhibits a low degree of anisotropy, i.e. a more controlled isotropic particle arrangement.

What is claimed is:

1. A method for controlling the orientation of the thermal expansion in the structure of carbonaceous stock comprising the step of forcing a stream of carbonaceous matter containing needle-like coke particles and a binder around a baffle plate, said baffle plate being placed perpendicularly to the axis of the direction of extrusion and just prior to the entrance of a forming die, whereby said stream abruptly changes direction after passing said baffle plate thus precluding the axial alignment of said particles and whereby after baking and graphitizing, said stock is characterized in that the ratio of the transverse to the longitudinal average coefficient of thermal expansion is lowered to less than about 2.5.

2. A method for controlling the orientation of the thermal expansion in the structure of carbonaceous stock comprising the steps of providing an obstructing plate with a plurality of passage ways just prior to the entrance of a forming die and forcing a stream of carbonaceous matter containing needle-like coke particles and a binder through said passage ways causing said stream to abruptly change direction and upset the axial orientation and alignment of said particles whereby after baking and graphitizing, said stock is characterized in that the ratio of transverse to the longitudinal average coefficient of thermal expansion is lowered to less than about 2.5.

3. A method for controlling the orientation of the thermal expansion in the structure of carbonaceous stock, comprising the step of forcing from a plurality of directions substantially perpendicular to the axis of a forming die, streams of carbonaceous matter containing needle-like coke particles and a binder, said streams being caused to converge at the entrance of said die whereby the axial alignment of said particles at the die is disrupted, and whereby after baking and graphitizing, said stock is characterized in that the ratio of the transverse to longitudinal average coefficient of expansion is lowered to less than about 2.5.

References Cited
UNITED STATES PATENTS

| | | | |
|---|---|---|---|
| 3,111,739 | 11/1963 | Horton et al. | 264—108 XR |
| 3,168,509 | 2/1965 | Juel | 264—105 |
| 3,196,486 | 7/1965 | Shesler et al. | 264—176 X |

OTHER REFERENCES

Thomas: German app. No. 1, 182,575, pub. Nov. 26, 1964, Class 264/29 (1 sheet dwg., 5 pp. spec.).

ROY B. MOFFITT, *Primary Examiner.*

J. A. FINLAYSON, *Assistant Examiner.*